United States Patent Office 2,735,839
Patented Feb. 21, 1956

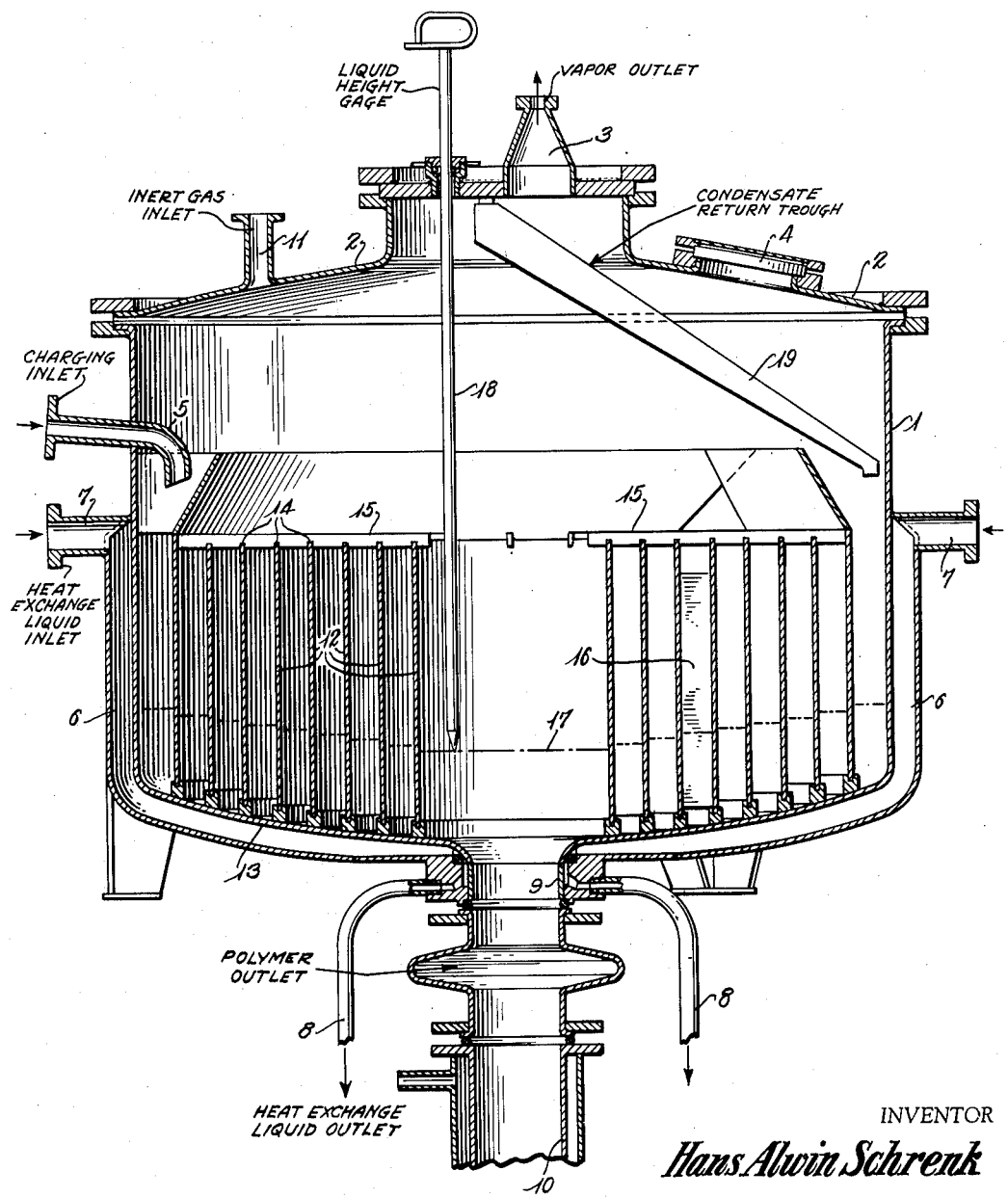

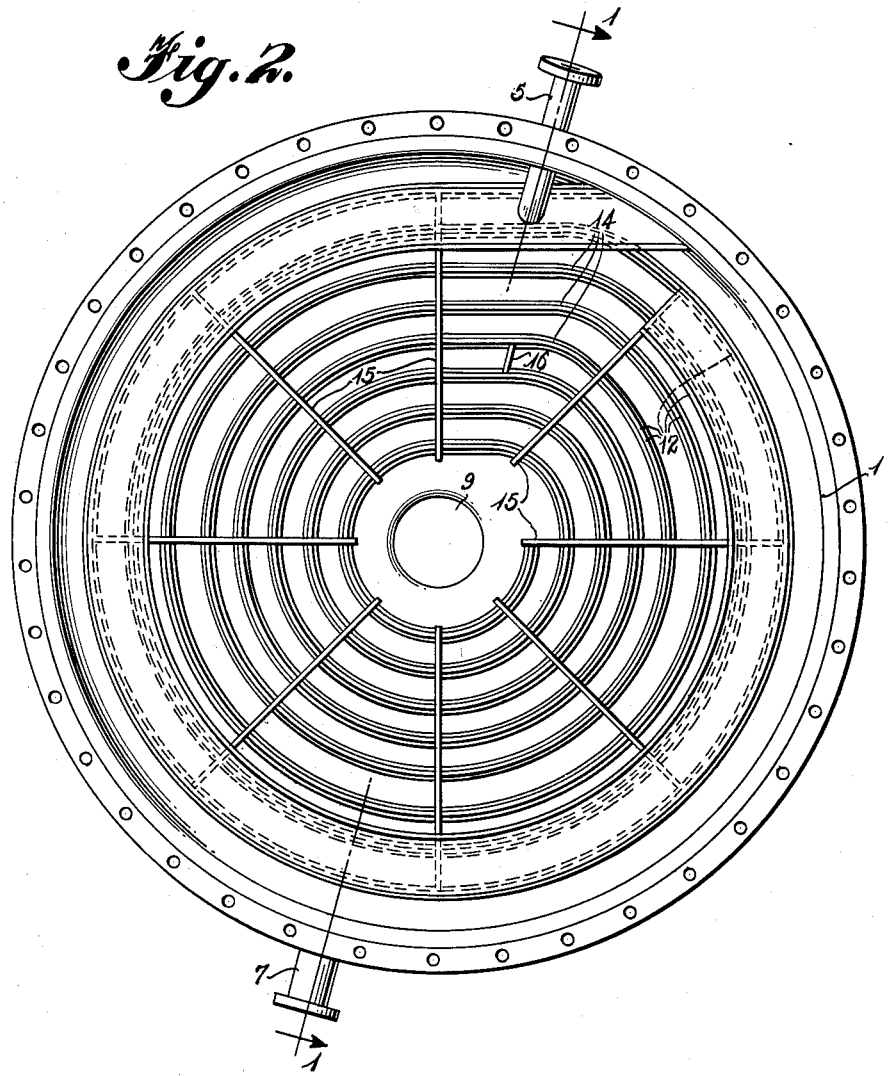

2,735,839

CONTINUOUS POLYMERIZATION OF MONOMERIC LACTAMS

Hans Alwin Schrenk, Arnhem, Netherlands, assignor, by mesne assignments, to American Enka Corporation, Enka, N. C., a corporation of Delaware Application November 29, 1951, Serial No. 258,810

Claims priority, application Netherlands December 27, 1950

8 Claims. (Cl. 260—78)

This invention relates to process and apparatus for the continuous manufacture of high molecular weight compounds by heating low molecular weight compounds, with or without catalysts and/or stabilizers, and particularly for the continuous manufacture of high molecular weight linear polymeric polyamides.

It has already been proposed to prepare high molecular weight polymeric compounds continuously from monomeric compounds by heating the low molecular weight monomeric raw materials, e. g., monomeric compounds, in a vertical column. The monomeric or low molecular weight compounds are supplied in the fluid, e. g., liquid, state at the top of the column, while the high molecular weight polymeric product is discharged continuously at the bottom of the column. The column preferably is kept filled to a predetermined level and is heated externally for maintaining the desired reaction temperature. As a catalyst, e. g., in the case of the polymerization of caprolactam to a high molecular weight linear polyamide, water, formic acid, or other substances may be employed. The relatively volatile catalyst is discharged from the top of the column in the form of gas and vapor, together with any other volatile constituents present in the reaction material or produced therein, while a suitable liquid seal is provided for preventing access of air or oxygen into the interior of the column.

While in practice the process just described is generally suitable, it does have certain drawbacks. This is largely because of the fact that the polymeric material obtained, e. g., the linear polyamide, does not always show a constant degree of polymerization. Moreover, it is difficult in practice with a given column to change the quantity of monomeric substance to be polymerized per unit of time, while at the same time keeping the other reaction conditions and hence the quality of the polymer product constant.

The difficulties just mentioned are largely due to the fact that the developed gases and/or vapors which are formed during the heating and the conversion reaction going on in the column, i. e., from the polymerization catalyst, move upwardly in the column and bring about certain disturbances during the course of the polymerization process. The upwardly moving gases and vapors prevent, for example, the regular and even downward movement of the mass to be polymerized in the column.

Moreover, due to substantial differences in the specific gravities of the monomeric starting material and the polymer product, troublesome flows tend to occur in consequence of which an inferior mixture of relatively high- and relatively low-polymeric material may be discharged at the bottom of the column. The disadvantages of such an imperfect polymerization mechanism especially show up in variations in the properties of the final products manufactured therefrom, particularly when the still-liquid polymerization mass is immediately spun to threads and fibers.

It is therefore an object of the present invention to provide process and apparatus for conducting polymerization reactions of the type mentioned above in which the disadvantages and imperfections of the prior art processes and apparatus are largely overcome. It is a further object of the invention to provide a convenient process that involves the use of simple apparatus for carrying out the continuous polymerizaiton of low molecular weight monomeric materials to high molecular weight polymerization products, especially those of the polyamide type, in such manner as largely to avoid the known disadvantages frequently encountered when the usual column polymerization methods and apparatus are employed.

The manner in which these and other objects of the invention are attained will become apparent from the following description of the invention, which is intended to be illustrative rather than limitative.

According to the present invention, it has been discovered that polymerization may be achieved in a very effective manner by causing the liquid monomeric substances to be polymerized to flow continuously during the course of the polymerization in a horizontal or nearly horizontal direction to a suitable discharge device, the gases and vapors that are being developed in, or given off from, the reaction mass thereby being enabled to leave the surface of the flowing reaction mass with a minimum of disturbance thereof.

As has been shown by a large amount of research, when operating in accordance with the present invention the gas and vapor development that inevitably occurs in the reaction mass undergoing polymerization does not disturb the course of the polymerization. On the contrary, since the gas bubbles move upwardly in a direction at right angles to the direction of flow of the moving reaction mass, this action actually favors the thorough mixing of the components of the reaction mass with the consequent production of an even temperature therethrough.

Moreover, owing to the relatively small thickness of the layer of liquid or molten material undergoing polymerization, the bubbles of gas and vapor can easily leave the upper surface of the reaction mixture and burst freely. The thus-separated gases and vapors can then be removed unhindered from the reaction zone without causing further disturbances in the reaction mass, while at the same time the polymerization mixture continues flowing under relatively quiescent conditions. Finally, as the polymerization reaction approaches completion the development of gases and vapors decreases regularly and finally stops.

It will be apparent that when employing a given catalyst for the polymerization of a given polymerizable monomeric material, the polymerization thereof is a function of a predetermined temperature and a predetermined heating time. Therefore, when employing any given catalyst at any given polymerization temperature, the polymerization time, i. e., the shortest heating time that will bring about the desired degree of polymerization, becomes thereby established. In the case of a given polymerization column of the prior art having these restrictions upon the modus operandi, it is very difficult to decrease the extent of filling of the column and of course it can be increased only very little. Consequently, the process and apparatus according to the present invention offer much greater possibilities for bringing about desired changes in the process variables depending upon miscellaneous factors to be mentioned hereinafter.

Thus, the rate of polymerization, i. e., production of polymer per unit of time, may be regulated very simply and conveniently merely by adjusting the thickness of the layer of the flowing reaction mass without changing the other polymerization conditions. Under otherwise identical conditions, it is for example possible in this manner to double the capacity of a given plant to produce a polymer of given characteristics by doubling the thickness of the layer of the flowing mass undergoing polymerization.

Under certain circumstances it may be desirable to construct the discharge device in such a way as to provide the necessary hydrostatic pressure for the further transport of the molten polymer, particularly if the mass of polymeric material is to be supplied immediately to a measuring pump for the formation of rods or for the spinning to threads or fibers.

The apparatus for carrying out the process according to the present invention is characterized by a horizontal or nearly horizontal channel which is open at the top side and which is confined in an enveloping space or chamber which can be closed, and which is provided with a device for introducing the monomeric material to be polymerized to the channel, a discharge device for the polymerized product, a discharge device for the developed gases and vapors, and suitable heating devices for heating the reaction mass and the polymerized product.

According to a preferred embodiment of the invention, the device may take the form of a horizontal or nearly horizontal helical channel enclosed within a suitable chamber. Due to this configuration the apparatus provides a relatively long path of flow within a relatively small area of the enveloping space or chamber, and thus in effect provides a polymerization reaction zone of relatively great length in a relatively small space.

Moreover, with such a helical configuration for the polymerization channel the passages can lie side by side and have a common partitioning wall. The channel may conveniently consist of a single metal strip bent in the shape of a spiral suitably fastened to a bed plate which serves as the channel bottom. The bottom of the enveloping tank or chamber may serve as the bed plate to which the spirally bent metal strip is attached and it will be observed that this form of construction of the polymerization channel offers a combination of advantages of a very simple structure, good utilization of the comparatively limited space available in the enveloping tank, and good heat transfer from one channel to the next.

The polymerization channel, which preferably has a rectangular cross section, is preferably relatively high and narrow. The large height in comparison to its width facilitates the adjustment of the duration of the polymerization treatment.

In the open polymerization channel there may sometimes occurs small differences in rates of flow between the surface layer and the bottom layer of the reaction mass. These differences in flow rates can be substantially eliminated by providing suitable flow obstacles across the path of the material flowing in the polymerization channel. These may take the form of partition walls or baffles set at right angles to the direction of the liquid flow in the channel, and not quite reaching to the channel bottom. In this way the liquid reaction mass is compelled to flow between the channel bottom and the undersides of these partition walls or baffles, thereby eliminating undesirable differences in flow rates at various levels of the flowing material.

The apparatus according to the present invention may also be constructed in such manner that the discharge device thereof is provided with suitable heating devices so that it constitutes a temperature regulating vessel for the finished polymer product. In this vessel, and before further processing takes place, the polymerized product may be given a predetermined temperature during the discharging operation which can differ from the polymerization temperature. This discharge device, or temperature regulating vessel, may take the form of a short or long vertical tube provided with a suitable heating jacket. In such a tube the reaction mass is under hydrostatic pressure, which of course is dependent on the height of the reaction mass. This pressure may be used for guiding and bringing about further flow of the polymeric reaction mass, including supplying the preliminary pressure for feeding the reaction mass to a pump of the measuring variety or otherwise connected to the foot of the discharge tube, for supplying the liquid polymeric reaction mass to a device known per se for spinning the same into threads or fibers.

In order still further to illustrate the present invention, reference is made to the accompanying diagrammatic drawings in which Figure 1 shows the apparatus in somewhat schematic fashion, the figure being a vertical cross-section on the line 1—1 of Figure 2; and Figure 2 is a top plan view of the device of Figure 1 with the cover of the apparatus removed to show the interior arrangement of parts.

Referring now to Figure 1, the apparatus consists of a tank 1 provided with a gas-tight cover 2. The cover is provided with a discharge opening 3 for gases and vapors evolved during the process, and with a sight glass 4. The tank is provided with a supply line 5 for introducing the monomeric reactant or reaction mixture, and with a heating jacket 6 for bringing the reaction mixture within the tank to the desired temperature. The heating jacket is provided with supply line 7 and discharge line 8 for circulation of the heating liquid. The tank is provided with a discharge opening 9 through which the polymerized product is withdrawn. The discharge opening 9 communicates with a downwardly directed temperature regulating vessel in the shape of a tube 10, which may be externally heated by a jacket through which flows a suitable heating liquid.

The cover 2 of the tank has an opening 11 through which the apparatus can be filled with an inert gas, for example nitrogen.

Within the tank 1, a helically bent metal strip 12 (see also Figure 2) is fastened to the bottom 13 of the tank, thereby forming a tortuous polymerization channel of considerable length within the tank. The top edges 14 of the spiral or metal helix are held in place by a series of spacer strips 15.

At one or more suitable places along the length of the polymerization channel defined by the spiral strip 12, partition or baffle members 16 are provided (one of these is shown in Figure 1). These baffle members reach to within a short distance of the bottom 13 of the tank 1 thereby partially obstructing the flow of the liquid reaction material through the polymerization channel.

The liquid level in the polymerization channel is shown by reference numeral 17, and for measuring the depth of the liquid within the tank a suitable height gauge 18 is provided.

Suitably disposed beneath the discharge opening 3 provided for removal of the gases and vapors is a collecting channel member 19 for guiding condensed liquid to the reaction mixture near the beginning of the polymerization channel, thereby preventing such liquid from directly entering the homogenizing or temperature regulating vessel 10. In this way it is possible to continuously remove directly and indirectly introduced water without at the same time losing substantial quantities of lactam or other valuable monomeric substances vaporized with the water.

The discharge of the final homogeneous polymerization product takes place by means of a gear pump (not shown) which discharges a constant predetermined quantity per unit time from the tubular temperature regulating vessel 10.

Because of its homogeneity the final product may be processed immediately either in a device for producing threads and fibers or in a device for the formation of rods or other shaped objects, for example by injection molding. In the discharge device (temperature regulating vessel 10) the polymerization product can be adjusted to any predetermined temperature which is most favorable for the subsequent processing, and which may and frequently does differ from the optimum polymerization temperature; and at the same time a suitable hydrostatic pressure, which is necessary for the feed of polymerization product to the pump, is provided by virtue of the foregoing arrangement of the discharge device. Thus, the process and apparatus of the present invention make it possible conveniently to connect one or more devices for manufacturing threads, fibers, rods, etc. immediately to it, thereby resulting in considerable economy in actual plant practice.

By way of further elucidation of the invention, an example of the process conducted in an apparatus according to the present invention is as follows:

*Example*

Through the charging inlet 5 of an apparatus constructed as described above, a mixture of epsilon-caprolactam with 0.1% of phosphoric acid and 5% of water as a catalyst was introduced at the rate (based on the epsilon-caprolactam content of the mixture) of 10 kg. per hour. The polymerization channel formed by the spiral metal strip 12 had a length of 20 meters, a height of 40 centimeters, and a width of 6 centimeters. The supply of monomeric reactant to and the discharge of the polymer product from the apparatus were regulated in such manner that the reaction mass remained for at least about 24 hours in the polymerization channel at about 260° C. and for about 6 hours in the temperature regulating vessel 10 at about 240° C.

The vapor outlet 3 of the tank was connected at a rectifying column (not shown) which was kept at 98° C. The water vapor developed during the course of the reaction, together with a part of the evaporated monomer, escaped through the vapor outlet 3 and passed into the rectifying column, where a part of the water vapor and a large part of the evaporated monomer condensed continuously and flowed back to the beginning of the polymerization channel via the collecting trough 19.

A linear polyamide product having an intrinsic viscosity of 1.3 was discharged from the apparatus at the rate of 10 kilograms per hour.

While the process and apparatus of the present invention have been described in conjunction with the use of a polymerization channel that is helical in form, this shape may be departed from without sacrificing all the advantages of the invention provided a shape is employed that gives substantially the maximum possible length of channel within a given space, the walls thereof forming the partitioning walls of the sections making up the channel.

When the apparatus is employed for the polymerization of substances which either in the monomeric or polymeric form tend to be corrosive, or wherein any other component of the reaction mixture tends to be corrosive, it is preferable to manufacture at least those parts coming in contact with such substances from a suitably resistant material such as stainless steel or the like.

While specific examples of preferred methods and apparatus embodying the present invention have been described above, it will be apparent that many changes and modifications may be made therein without departing from the spirit of the invention. It will therefore be understood that the examples recited and the particular apparatus and methods of procedure set forth above are intended to be illustrative only, and are not intended to limit the invention.

What is claimed is:

1. A process for the continuous conversion of relatively low molecular weight monomeric lactams to relatively high molecular weight fiber-forming synthetic linear polyamides of substantially uniform quality, which comprises continuously passing said monomeric lactam in the molten state through a heated elongated spiral substantially horizontal polymerization zone of great length as compared to its height while continuously supported and in the form of a continuously flowing uninterrupted layer of liquid having an unconfined upper surface, and there subjecting said liquid to polymerization conditions including heating, thereby enabling gases and vapors including water and monomeric lactam that are evolved from the reaction mass readily to leave the upper surface of the flowing molten reaction mass with a minimum of disturbance to uniform flow of the molten mass through the polymerization zone and bringing about at least substantial polymerization of said monomeric lactam to relatively high molecular weight synthetic linear polyamide in said polymerization zone, the reaction being conducted while substantially completely excluding free oxygen from the polymerization zone, passing the thus-treated molten material to a discharge zone, maintaining the discharge zone substantially filled with a relatively large mass of the molten polymeric material, and removing the relatively high molecular weight fiber-forming synthetic linear polyamide product from said discharge zone.

2. A process defined in claim 1 in which the monomeric lactam undergoing polymerization is caprolactam.

3. A process as defined in claim 1 in which free oxygen is substantially completely excluded from the polymerization zone by a blanket of nitrogen.

4. A process for the continuous conversion of relatively low molecular weight monomeric lactams to relatively high molecular weight fiber-forming synthetic linear polyamides of substantially uniform quality, which comprises continuously passing said monomeric lactam in the molten state through a heated elongated spiral substantially horizontal polymerization zone of great length as compared to its height while continuously supported and in the form of a continuously flowing uninterrupted layer of liquid having an unconfined upper surface, and there subjecting said liquid to polymerization conditons including heating, thereby enabling gases and vapors including water and monomeric lactam that are evolved from the reaction mass readily to leave the upper surface of the flowing molten reaction mass with a minimum of disturbance to uniform flow of the molten mass through the polymerization zone and bringing about at least substantial polymerization of said monomeric lactam to relatively high molecular weight synthetic linear polyamide in said polymerization zone, the reaction being conducted while substantially completely excluding free oxygen from the polymerization zone, passing the thus-treated molten material to a vertically disposed discharge zone, maintaining the discharge zone substantially filled with a relatively large mass of the molten polymeric material, subjecting the molten polymeric material in the discharge zone to a temperature that is different from the temperature in the polymerization zone, and removing the relatively high molecular weight fiber-forming synthetic linear polyamide product from said discharge zone.

5. A process as defined in claim 4 in which the monomeric lactam undergoing polymerization is caprolactam.

6. A process as defined in claim 4 in which free oxygen is substantially completely excluded from the polymerization zone by a blanket of nitrogen.

7. A process for the continuous production of high molecular weight fiber-forming synthetic linear polyamides by heating relatively low molecular weight monomeric lactams which comprises flowing said monomeric lactam in the molten state in a substantially horizontal direction while heating same in the form of a continuously supported uninterrupted liquid layer, the polymerization-reaction taking place in a reaction zone defined by an open, substantially horizontal channel provided in a closed tank with successive parts of said channel being separated by common walls, and regulating the height of the liquid layer in said channel and the temperature therein whereby the polymerization-reaction proceeds such that at the end of said horizontal flow the gas- and vapor-development, including the evolution of water and monomeric lactam, has stopped substantially completely, thereafter discharging the polymeric material from the reaction zone into a communicating discharge zone through which it flows in a generally vertical direction, said discharge zone being substantially filled with a relatively large mass of the molten polymeric material, subjecting the polymeric material in the discharge zone to a temperature that is different from the temperature of polymerization, the resulting high molecular weight synthetic linear polyamide product being of homogeneous quality eminently suitable for spinning despite possible fluctuations in rates of feed of said monomeric lactam to the reaction zone and of withdrawal of polymeric product therefrom, and removing the relatively high molecular weight fiber-forming synthetic linear polyamide product from said discharge zone.

8. A process as defined in claim 7 in which the monomeric lactam undergoing polymerization is caprolactam.

References Cited in the file of this patent

UNITED STATES PATENTS

| | | |
|---|---|---|
| 506,752 | Warner | Oct. 17, 1893 |
| 902,177 | Schwoerer | Oct. 27, 1908 |
| 1,036,609 | Grosvenor | Aug. 27, 1912 |
| 1,488,274 | Murray | Mar. 25, 1924 |
| 2,090,586 | Ward | Aug. 17, 1937 |
| 2,361,717 | Taylor | Oct. 31, 1944 |
| 2,486,684 | Schlesman et al. | Nov. 1, 1949 |

FOREIGN PATENTS

| | | |
|---|---|---|
| 980,573 | France | Dec. 27, 1950 |
| 237,400 | Switzerland | Sept. 1, 1945 |
| 66,548 | Denmark | Apr. 5, 1948 |

OTHER REFERENCES

Ser. No. 309,376, Friederich et al., (A. P. C.), published Apr. 20, 1943.